(12) United States Patent
Elizalde et al.

(10) Patent No.: US 8,586,697 B2
(45) Date of Patent: Nov. 19, 2013

(54) COATINGS REPAIRABLE BY INTRODUCTION OF ENERGY

(75) Inventors: Oihana Elizalde, Charlotte, NC (US); Frederic Lucas, Ludwigshafen (DE); Angelika Maria Steinbrecher, Stuttgart (DE); Lydie Tuchbreiter, Charlotte, NC (US); Axel Pfahler, Hohberg (DE); Rolf Muelhaupt, Freiburg (DE)

(73) Assignee: BASF SE, Ludwigshafen (DE)

( * ) Notice: Subject to any disclaimer, the term of this patent is extended or adjusted under 35 U.S.C. 154(b) by 166 days.

(21) Appl. No.: 13/081,874

(22) Filed: Apr. 7, 2011

(65) Prior Publication Data

US 2011/0251335 A1 Oct. 13, 2011

Related U.S. Application Data

(60) Provisional application No. 61/322,315, filed on Apr. 9, 2010.

(51) Int. Cl.
*C08G 18/32* (2006.01)

(52) U.S. Cl.
USPC .................................................. 528/74.5

(58) Field of Classification Search
USPC .................................................. 528/74.5
See application file for complete search history.

(56) References Cited

U.S. PATENT DOCUMENTS

| | | | |
|---|---|---|---|
| 3,224,988 A | 12/1965 | Skreckoski | |
| 4,584,229 A | 4/1986 | Bourelier et al. | |
| 4,596,678 A | 6/1986 | Merger et al. | |
| 4,596,679 A | 6/1986 | Hellbach et al. | |
| 4,711,805 A | 12/1987 | Helmer et al. | |
| 4,977,207 A | 12/1990 | Hoefer et al. | |
| 5,087,739 A | 2/1992 | Bohmholdt et al. | |
| 6,559,225 B1 | 5/2003 | Irle et al. | |
| 2006/0183848 A1 | 8/2006 | Maier et al. | |
| 2009/0142229 A1* | 6/2009 | MacDonald et al. | 422/68.1 |
| 2009/0286940 A1* | 11/2009 | Frings et al. | 525/460 |

FOREIGN PATENT DOCUMENTS

| | | |
|---|---|---|
| DE | 1 445 216 | 11/1968 |
| DE | 26 34 816 A1 | 2/1977 |
| DE | 199 30 961 A1 | 1/2001 |
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 135 404 A1 | 3/1985 |
| EP | 0 278 394 A2 | 8/1988 |
| EP | 0 355 028 A1 | 2/1990 |
| EP | 0 355 443 A2 | 2/1990 |
| EP | 0 403 921 A2 | 12/1990 |
| EP | 0 635 348 A1 | 1/1995 |
| EP | 1 204 701 B1 | 9/2005 |
| JP | 50-105905 | 8/1975 |
| WO | WO 97/08255 A1 | 3/1997 |
| WO | WO 2005/010067 A1 | 2/2005 |
| WO | WO 2007/039133 A1 | 4/2007 |

OTHER PUBLICATIONS

International Search Report issued Jul. 18, 2011 in Application No. PCT/EP2011/055558 (With English Translation of Category of Cited Documents).

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

The present invention relates to coating compositions repairable by introduction of energy and comprising defined fatty acid esters, to coatings obtained therewith and repairable by introduction of energy, to methods of producing them, and to their use.

18 Claims, No Drawings

COATINGS REPAIRABLE BY INTRODUCTION OF ENERGY

The present invention relates to coating compositions repairable by introduction of energy and comprising defined fatty acid esters, to coatings obtained therewith and repairable by introduction of energy, to methods of producing them, and to their use.

Coatings based on polyurethanes are likewise used in order to heal scratches on glass. They make use of the flowability of polyurethanes in the film. For this utility, mention may be made, by way of example, of U.S. Pat. No. 4,584,229, EP 135404 A1, DE 2634816, and EP 635348 A1.

All of the prior-art self-healing coating systems described to date make use solely of a physical residual flowability of a coating after curing in order to heal scratches that have formed. Sufficiently high flowability of the coatings, however, presupposes a low crosslinking density. This leads to inadequate mechanical resistance properties, failing, for example, to meet the requirements for automotive applications in terms of scratch resistance or chemical resistance.

Only EP 355 028 A describes true chemical self-healing of a coating. In this case a lower coating film comprises an aromatic ketone, which on UV exposure or under the effect of sunlight brings about the crosslinking of lower coating films and hence produces healing of mechanical defects through the formation of new chemical bonds. A disadvantageous effect here is the deficient selectivity in the forging of new crosslinking points, since crosslinking may progress in the coating and then leads to embrittlement.

It is an object of the present invention to provide coatings which are repairable by introduction of energy, whose scratch resistance at least matches that of the known, prior-art coatings and whose repairability, brought about by means of introduction of energy, is improved as compared with that of comparable coatings.

This object is achieved by means of coating compositions comprising as constituent components
(A) at least one ester which has at least two hydroxyl groups, formally constructed of
(A1) at least one fatty acid which contains at least 12 carbon atoms and
(A2) at least one polyol having at least three hydroxyl groups,
(B) at least one nonblocked or blocked di- or polyisocyanate, and
(C) at least one polyhydroxy compound.

Cleavage of the bond between isocyanate groups and hydroxyl groups is accomplished by introduction of heat and/or high-energy radiation and/or by application of pressure, preferably by introduction of heat and/or high-energy radiation, and more preferably by introduction of heat, such as thermally or by NIR radiation, for example. Under the cleavage conditions the hydroxyl groups and also isocyanate groups are at least partly reformed and can be newly linked again. In the cleaved state, therefore, the coating material is more readily flowable than the coating, scratches are able to heal by the flow of the relatively low-viscosity coating composition, and after the end of the introduction of energy the coating composition is able to crosslink once again by renewed forging of the bonds between the hydroxyl groups and isocyanate groups.

For the purposes of this text the term coating composition means the uncured composition comprising coating medium (binder) and, where desired, pigment and/or other, typical coatings additives.

The coating means the applied and dried and/or cured coating composition.

The compounds (A) of the invention comprise on average at least 2, more preferably 2 to 20, very preferably 2 to 10, more particularly 2 to 6, especially 2 to 4, and often 2 to 3 hydroxyl groups.

Hydroxyl groups may be present in the compound (A) in amounts of up to 5 mol/kg of compound (A), preferably 0.1 to 5, more preferably 0.3 to 4.5, very preferably 0.5 to 4, and more particularly 1 to 3 mol/kg.

Component (A1) is at least one fatty acid, for example, one to five, preferably one to three, more preferably one to two, and very preferably just one fatty acid.

It is a preferred embodiment of the present invention to use, in particular, natural fatty acids in the form of their mixtures.

The fatty acid (A1) contains at least 12 carbon atoms, preferably at least 14, and more preferably at least 16.

Generally speaking, the fatty acids (A1) contain up to 100 carbon atoms, preferably up to 80, and more preferably up to 60.

The compound (A1) comprises in general alkane-, alkene-, alkadiene- or alkapolyene-carboxylic acids, which may be linear or branched, preferably linear, preferably alkane- or alkene-carboxylic acids, more preferably alkanecarboxylic acids.

Examples thereof are lauric acid, myristic acid, pentadecanoic acid, palmitic acid, margaric acid, stearic acid, nonadecanoic acid, arachidic acid, behenic acid, lignoceric acid, hexacosanoic acid, octacosanoic acid, triacontanoic acid, dotricosanoic acid, tritricosanoic acid, tetratricosanoic acid, pentatricosanoic acid, oleic acid, linoleic acid, and linolenic acid.

The compound (A2) comprises at least one, preferably just one, at least trifunctional polyol, preferably having three to eight, more preferably having three to six, and very preferably having three to four hydroxyl groups.

Examples thereof are trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, and isomalt.

Component (A2) may preferably also be at least partly alkoxylated, more preferably ethoxylated and/or propoxylated, very preferably ethoxylated.

Per hydroxyl group of the parent polyol, the degree of alkoxylation may be on average from 1 to 5, preferably from 1 to 3.

By "ethoxylation" in this context is meant the presence of —[—$CH_2$—$CH_2$—O—]— groups, and by "propoxylation" the presence of —[—$CH_2$—$CH(CH_3)$—O—]— and/or —[—$CH(CH_3)$—$CH_2$—O—]— groups.

This can be achieved by reacting the parent polyols with ethylene oxide and/or propylene oxide.

Reacting the parent polyols with an alkylene oxide is familiar per se to the skilled person. Possible forms of its implementation are found in Houben-Weyl, Methoden der Organischen Chemie, 4th edition, 1979, Thieme Verlag Stuttgart, edited by Heinz Kropf, volume 6/1a, Part 1, pages 373 to 385.

The preparation is carried out preferably as follows:

The parent polyol is dissolved if desired in a suitable solvent, such as benzene, toluene, xylene, tetrahydrofuran, hexane, pentane or petroleum ether, for example, and the solution is introduced at temperatures between 0° C. and 120° C., preferably between 10 and 100° C., and more preferably between 20 and 80° C., preferably under inert gas, such as nitrogen, for example. Added to this initial charge continuously or in portions is the alkylene oxide, if desired dissolved, at a temperature of −30° C. to 50° C., in one of the abovementioned solvents, with thorough mixing, the metered addition taking place at a rate such that the temperature of the reaction mixture is maintained at between 120 and 180° C., preferably between 120 and 150° C. This reaction may take place under a pressure of up to 60 bar, preferably up to 30 bar, and more preferably up to 10 bar.

The compounds (A) can be prepared by reacting the compounds (A1) with (A2) in the desired stoichiometric ratio, preferably with acid catalysis and with removal of the water of reaction by means of an azeotrope former.

Suitable esterification catalysts include the typical mineral acids and sulfonic acids, preferably sulfuric acid, phosphoric acid, alkylsulfonic acids (e.g., methanesulfonic acid, trifluoromethanesulfonic acid), and arylsulfonic acids (e.g., benzene-, p-toluene- or dodecylbenzenesulfonic acid) or mixtures thereof, although acidic ion exchangers are also conceivable.

Particular preference is given to sulfuric acid, methanesulfonic acid and p-toluenesulfonic acid, or mixtures thereof.

They are used in general in an amount of 0.1%-5% by weight, based on the esterification mixture, preferably 0.5%-5%, more preferably 1%-4%, and very preferably 2%-4% by weight.

Solvents especially suitable for the azeotropic removal of the water of reaction include aliphatic, cycloaliphatic, and aromatic hydrocarbons or mixtures thereof.

Preference is given to employing n-pentane, n-hexane, n-heptane, cyclohexane, methylcyclohexane, benzene, toluene or xylene. Particularly preferred are cyclohexane, methylcyclohexane, and toluene.

The amount used is 10%-200% by weight, preferably 20%-100% by weight, more preferably 30% to 100% by weight, based on the sum of alcohol and (meth)acrylic acid.

The reaction temperature is generally at 60-140° C., preferably 70-110° C., very preferably at 75-100° C. The initial temperature is generally below 100° C., preferably below 90° C., and more preferably below 80° C.

The reaction time is generally 3-20 hours, preferably 5-15, and more preferably 7 to 12 hours.

The preparation of the compounds (A) is, however, not essential to the invention.

Critical in accordance with the invention is the above-specified average hydroxyl-group functionality of the compounds (A). Accordingly there may in each compound (A) be one or more compounds (A1) present.

Preferred compounds (A) are those which have a melting point of at least 40° C., more preferably at least 45° C., and very preferably at least 50° C.

Besides the compound (A) there is additionally present in the coating compositions of the invention at least one further component (B) which comprises at least one nonblocked or blocked di- or polyisocyanate.

The compounds in question may comprise monomers or oligomers of aromatic, aliphatic or cycloaliphatic diisocyanates, preferably of aliphatic or cycloaliphatic diisocyanates.

The NCO functionality of such a compound is generally at least 1.8 and can be up to 8, preferably 1.8 to 5, and more preferably 2 to 4.

Suitable polyisocyanates include polyisocyanates containing isocyanurate groups, polyisocyanates containing uretdione groups, polyisocyanates containing biuret groups, polyisocyanates containing urethane groups or allophanate groups, polyisocyanates comprising oxadiazinetrione groups or iminooxadiazinedione groups, uretonimine-modified polyisocyanates, of linear or branched $C_4$-$C_{20}$ alkylene diisocyanates, cycloaliphatic diisocyanates having a total of 6 to 20 C atoms or aromatic diisocyanates having a total of 8 to 20 C atoms, or mixtures thereof.

The diisocyanates are preferably isocyanates having 4 to 20 C atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo-[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate. Mixtures of said diisocyanates may also be present.

Also suitable are higher isocyanates, having on average more than 2 isocyanate groups. Examples include triisocyanates such as triisocyanatononane, 2,4,6-triisocyanatotoluene, triphenylmethane triisocyanate or 2,4,4'-triisocyanatodiphenyl ether, or the mixtures of diisocyanates, triisocyanates, and higher polyisocyanates for example that are obtained by phosgenating corresponding aniline/formaldehyde condensates and represent polyphenyl polyisocyanates containing methylene bridges.

The di- and polyisocyanates which can be used preferably have an isocyanate group (calculated as NCO, molecular weight=42) content of 10% to 60% by weight, based on the di- and polyisocyanate (mixture), preferably 15% to 60% by weight, and more preferably 20% to 55% by weight.

Preference is given to aliphatic and/or cycloaliphatic di- and polyisocyanates, qualified collectively as (cyclo)aliphatic for the purposes of this specification, examples being the aliphatic and/or cycloaliphatic diisocyanates stated above, or mixtures thereof.

Particular preference is given to hexamethylene diisocyanate, 1,3-bis-(isocyanatomethyl)cyclohexane, isophorone diisocyanate, and 4,4'- or 2,4'-di-(isocyanatocyclohexyl)methane, very particular preference to isophorone diisocyanate and hexamethylene diisocyanate, and especial preference to hexamethylene diisocyanate.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

Aromatic isocyanates are those which comprise at least one aromatic ring system.

Cycloaliphatic isocyanates are those which comprise at least one cycloaliphatic ring system.

Aliphatic isocyanates are those which comprise exclusively linear or branched chains, in other words acyclic compounds.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087, 739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other by-products recycled from the reaction process. Di- or polyisocyanates obtained in this way generally contain a very low or even unmeasurable fraction of chlorinated compounds, leading to favorable color numbers in the products.

In one embodiment of the present invention the di- and polyisocyanates (B) have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Alternatively, of course, di- and polyisocyanates (B) having a higher chlorine content can also be used.

Mention may further be made of
1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, tris-isocyanatoalkyl and/or tris-isocyanatocycloalkyl isocyanurates, which constitute cyclic trimers of the diisocyanates, or are mixtures with their higher homologues containing more than one isocyanurate ring. The isocyanatoisocyanurates generally have an NCO content of 10% to 30% by weight, in particular 15% to 25% by weight, and an average NCO functionality of 2.6 to 8.
2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates. The uretdione diisocyanates can be used as a sole component or in a mixture with other polyisocyanates, particularly those specified under 1).
3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologues. These polyisocyanates containing biuret groups generally have an NCO content of 18% to 22% by weight and an average NCO functionality of 2.8 to 4.5.
4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclo-dodecanol, trimethylolpropane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,4-butanediol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl) propane, 1,1-, 1,2-, 1,3-, and 1,4-cyclohexanedimethanol, 1,2-, 1,3- or 1,4-cyclohexanediol or mixtures thereof. These polyisocyanates containing urethane and/or allophanate groups generally have an NCO content of 12% to 20% by weight and an average NCO functionality of 2.5 to 4.5.
5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.

Polyisocyanates 1) to 11) may be used in a mixture, including if desired in a mixture with diisocyanates.

The di- and polyisocyanates (B) may also be present at least partly in blocked form.

Groups of this kind for blocking isocyanates are described in D. A. Wicks, Z. W. Wicks, Progress in Organic Coatings, 36, 148-172 (1999), 41, 1-83 (2001) and also 43, 131-140 (2001).

This is especially preferred when the coating compositions of the invention are to be employed in one-component form.

Preferred compounds (B) are the urethanes, biurets, and isocyanurates, more preferably the isocyanurates, of hexamethylene 1,6-diisocyanate (HDI) or 1-isocyanato-3-isocyanatomethyl-3,5,5-trimethylcyclohexane, very preferably of 1,6-hexamethylenediisocyanate.

As a result of their preparation it is possible for polyisocyanates (B) still to have a small fraction of their parent monomeric diisocyanate; for example, up to 5%, more preferably up to 3%, very preferably up to 2%, in particular up to 1%, especially up to 0.5%, and even up to 0.25%, by weight.

The coating compositions of the invention further comprise at least one binder (C) and also, if desired, typical coatings additives (D) and also, if desired, pigments and/or fillers (E).

The binders (C) may be, for example, polyacrylate polyols, polyester polyols, polyether polyols, polyurethane polyols;

polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft copolymers from the stated groups of compounds, having, for example, different glass transition temperatures, and also mixtures of the stated binders. Preference is given to polyacrylate polyols, polyester polyols, and polyurethane polyols.

Preferred OH numbers, measured in accordance with DIN 53240-2 (potentiometrically), are 40-350 mg KOH/g resin solids for polyesters, preferably 80-180 mg KOH/g resin solids, and 15-250 mg KOH/g resin solids for polyacrylateols, preferably 80-160 mg KOH/g.

The binders may additionally have an acid number in accordance with DIN EN ISO 3682 (potentiometrically) of up to 200 mg KOH/g, preferably up to 150, and more preferably up to 100 mg KOH/g.

Particularly preferred binders (C) are polyacrylate polyols and polyesterols.

Polyacrylate polyols preferably have a molecular weight $M_n$ of at least 500, more preferably at least 1200 g/mol. The molecular weight $M_n$ may in principle have no upper limit, preferably up to 50 000, more preferably up to 20 000 g/mol, very preferably up to 10 000 g/mol, and more particularly up to 5000 g/mol.

The hydroxy-functional monomers (see below) are used in the copolymerization in amounts such as to result in the above-stated hydroxyl numbers for the polymers, which correspond in general to a hydroxyl group content in the polymers of 0.5% to 8%, preferably 1% to 5% by weight.

These are hydroxyl-containing copolymers of at least one hydroxyl-containing (meth)acrylate with at least one further polymerizable comonomer selected from the group consisting of (meth)acrylic acid alkyl esters, vinylaromatics, $\alpha,\beta$-unsaturated carboxylic acids, and other monomers.

As (meth)acrylic acid alkyl esters, mention may be made, by way of example, of $C_1$-$C_{20}$ alkyl (meth)acrylates; vinylaromatics are those having up to 20 C atoms; $\alpha,\beta$-unsaturated carboxylic acids also comprise their anhydrides and other monomers are for example, vinyl esters of carboxylic acids comprising up to 20 C atoms, ethylenically unsaturated nitriles, vinyl ethers of alcohols comprising 1 to 10 C atoms, and, less preferably, aliphatic hydrocarbons having 2 to 8 C atoms and 1 or 2 double bonds.

Preferred (meth)acrylic acid alkyl esters are those with a $C_1$-$C_{10}$ alkyl radical, such as methyl methacrylate, methyl acrylate, n-butyl acrylate, ethyl acrylate, and 2-ethylhexyl acrylate.

In particular, mixtures of the (meth)acrylic acid alkyl esters are also suitable.

Vinyl esters of carboxylic acids having 1 to 20 C atoms are, for example, vinyl laurate, vinyl stearate, vinyl propionate, and vinyl acetate.

Possible examples of $\alpha,\beta$-unsaturated carboxylic acids and their anhydrides include acrylic acid, methacrylic acid, fumaric acid, crotonic acid, itaconic acid, maleic acid, and maleic anhydride, preferably acrylic acid.

Hydroxy-functional monomers include monoesters of $\alpha,\beta$-unsaturated carboxylic acids, such as acrylic acid, methacrylic acid (referred to for short in this specification as "(meth)acrylic acid"), with diols or polyols, having preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentylglycol, neopentylglycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, poly-THF having a molar weight between 162 and 4500, preferably 250 to 2000, poly-1,3-propanediol or polypropylene glycol having a molar weight between 134 and 2000, or polyethylene glycol having a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

Examples of suitable vinylaromatic compounds include vinyltoluene, $\alpha$-butylstyrene, $\alpha$-methylstyrene, 4-n-butylstyrene, 4-n-decylstyrene, and preferably styrene.

Examples of nitriles are acrylonitrile and methacrylonitrile.

Suitable vinyl ethers are, for example, vinyl methyl ether, vinyl isobutyl ether, vinyl hexyl ether, and vinyl octyl ether.

As nonaromatic hydrocarbons having 2 to 8 C atoms and one or two olefinic double bonds, mention may be made of butadiene, isoprene, and also ethylene, propylene, and isobutylene.

In addition it is possible to employ N-vinylformamide, N-vinylpyrrolidone, and N-vinylcaprolactam and also ethylenically unsaturated acids, more particularly carboxylic acids, acid anhydrides or acid amides, and also vinylimidazole. Comonomers containing epoxide groups, such as glycidyl acrylate or glycidyl methacrylate, for example, or monomers such as N-methoxymethylacrylamide or -methacrylamide, can be used as well in small amounts.

Preference is given to esters of acrylic acid or of methacrylic acid having 1 to 18, preferably 1 to 8, carbon atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The monomers bearing hydroxyl groups are used in the copolymerization of the hydroxyl-bearing (meth)acrylates in a mixture with other polymerizable, preferably free-radically polymerizable, monomers, preferably those composed to an extent of more than 50% by weight of $C_1$-$C_{20}$, preferably $C_1$ to $C_4$ alkyl (meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred are the polymers which besides the hydroxyl-bearing monomers are composed to an extent of more than 60% by weight of $C_1$-$C_{10}$ alkyl (meth)acrylates, styrene and its derivatives, or mixtures thereof.

The polymers can be prepared by polymerization in accordance with customary methods. Preferably the polymers are prepared in an emulsion polymerization or in organic solution. Continuous or discontinuous polymerization methods are possible. Of the discontinuous methods, mention may be made of the batch method and the feed method, the latter being preferred. With the feed method the solvent is introduced as an initial charge, on its own or together with a fraction of the monomer mixture, this initial charge is heated to the polymerization temperature, the polymerization is initiated free-radically in the case of an initial monomer charge, and the remaining monomer mixture is metered in together with an initiator mixture over the course of 1 to 10 hours, preferably 3 to 6 hours. If appropriate, activation is performed again subsequently in order to carry out the polymerization to a conversion of at least 99%.

Suitable solvents include, for example, aromatics, such as solvent naphtha, benzene, toluene, xylene, chlorobenzene, esters such as ethyl acetate, butyl acetate, methyl glycol acetate, ethyl glycol acetate, methoxypropyl acetate, ethers such as butyl glycol, tetrahydrofuran, dioxane, ethyl glycol ether, ketones such as acetone, methyl ethyl ketone, halogenated solvents such as methylene chloride or trichloromonofluoroethane.

Further binders (C) are, for example, polyester polyols, of the kind obtainable by condensing polycarboxylic acids, more particularly dicarboxylic acids, with polyols, more particularly diols. In order to ensure a polyester polyol functionality which is appropriate for the polymerization, use is also made in part of triols, tetroles, etc., and also triacids, etc.

Polyester polyols are known for example from Ullmanns Enzyklopädie der technischen Chemie, 4th Edition, Volume 19, pp. 62 to 65. Preference is given to using polyester polyols obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyester polyols. The polycarboxylic acids may be aliphatic, cycloaliphatic, aromatic or heterocyclic and may if appropriate be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$ alkyl esters for example, preferably methyl, ethyl or n-butyl esters, of the stated acids are used. Preference is given to dicarboxylic acids of the general formula HOOC—$(CH_2)_y$—COOH, y being a number from 1 to 20, preferably an even number from 2 to 20, more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 4500, preferably 250 to 2000, poly-1,3-propanediol having a molar mass between 134 and 1178, poly-1,2-propanediol having a molar mass between 134 and 898, polyethylene glycol having a molar mass between 106 and 458, neopentylglycol, neopentylglycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, or isomalt, which optionally may be alkoxylated, as described above.

Preference is given to alcohols of the general formula HO—$(CH_2)_x$—OH, x being a number from 1 to 20, preferably an even number from 2 to 20. Preferred are ethylene glycol, butane-1,4-diol, hexane-1,6-diol, octane-1,8-diol, and dodecane-1,12-diol. Additionally preferred is neopentyl glycol.

Also suitable, further, are polycarbonate diols such as may be obtained, for example, by reacting phosgene with an excess of the low molecular mass alcohols specified as constituent components for the polyester polyols.

Also suitable are lactone-based polyester diols, which are homopolymers or copolymers of lactones, preferably hydroxyl-terminated adducts of lactones with suitable difunctional starter molecules. Suitable lactones are preferably those deriving from compounds of the general formula HO—$(CH_2)_z$—COOH, z being a number from 1 to 20 and it also being possible for a hydrogen atom of a methylene unit to be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and also mixtures thereof. Suitable starter components are, for example, the low molecular mass dihydric alcohols specified above as a constituent component for the polyester polyols. The corresponding polymers of E-caprolactone are particularly preferred. Lower polyester diols or polyether diols can also be used as starters for preparing the lactone polymers. In lieu of the polymers of lactones it is also possible to employ the corresponding, chemically equivalent polycondensates of the hydroxycarboxylic acids that correspond to the lactones.

In polyurethane coating materials, polyester molar masses $M_n$ of 800-4000 g/mol are typical, the polyesters used herein not being limited thereto.

Additionally suitable as binders are polyetherols as well, which are prepared by addition reaction of ethylene oxide, propylene oxide and/or butylene oxide, preferably ethylene oxide and/or propylene oxide, and more preferably ethylene oxide, with H-active components. Polycondensates of butanediol are likewise suitable. In polyurethane coating materials, polyether molar masses $M_n$ of 500-2000 g/mol are typical, the polyethers used herein not being limited thereto.

The polymers may at least partly be replaced by what are called reactive diluents. These may be blocked, secondary or primary amines (aldimines and ketimines), or compounds having sterically hindered and/or electron-deficient secondary amino groups, examples being aspartic esters in accordance with EP 403921 or WO 2007/39133.

Further, typical coatings additives (E) which may be used include for example antioxidants, stabilizers, activators (accelerants), antistats, flame retardants, thickeners, thixotropic agents, surface-active agents, viscosity modifiers, plasticizers or chelating agents.

Suitable thickeners include not only free-radically (co) polymerized (co)polymers but also customary organic and inorganic thickeners such as hydroxymethylcellulose or bentonite.

As chelating agents it is possible, for example, to use ethylenediamineacetic acid and its salts, and also β-diketones.

Suitable fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter obtainable as Tinuvin® grades from Ciba-Spezialitatenchemie), and benzophenones. They can be employed alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1% to 5.0% by weight, based on the solid components comprised in the preparation.

The additives (D), where they are solids, preferably have a particle size below 100 μm and more preferably below 50 μm.

In one particular embodiment the additives (D), where they are solids, preferably have a particle size of 1 to 1000 nm, more preferably 1 to 100 nm, very preferably 5 to 50 nm, and in particular 5 to 25 nm.

Particles of this kind may be constituted such as described in EP 1204701 B1, paragraph [0032] to [0059], which is hereby part of the disclosure content of this specification.

The distribution of the particles within the finished coating may be uniform or nonuniform. In the case of a nonuniform distribution the particles are preferably at a higher concentration at the surface of the coating than within the coating.

The coating compositions may further comprise pigments, dyes and/or fillers (E).

Pigments, according to CD Römpp Chemie Lexikon-Version 1.0, Stuttgart/New York: Georg Thieme Verlag 1995, with reference to DIN 55943, are particulate, "organic or inorganic, chromatic or achromatic colorants which are virtually insoluble in the application medium". Pigments differ in this respect from soluble dyes.

Virtually insoluble here means a solubility at 25° C. of below 1 g/1000 g of application medium, preferably below 0.5 g, more preferably below 0.25 g, very preferably below 0.1 g, and in particular below 0.05 g/1000 g of application medium.

Examples of pigments comprise any desired systems of absorption pigments and/or effect pigments, preferably absorption pigments. There are no restrictions whatsoever governing the number and selection of the pigment components. They can be adapted as desired to the particular requirements, such as the desired color impression, for example.

By effect pigments are meant all pigments which exhibit a platelet-shaped construction and impart specific decorative color effects to a surface coating. The effect pigments comprise, for example, all of the effect-imparting pigments which can be employed commonly in vehicle finishing and industrial coating. Examples of effect pigments of this kind are pure metal pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments which can be used in the coatings industry. Examples of organic absorption pigments are azo pigments, phthalocyanine pigments, quinacridone pigments, and pyrrolopyrrole pigments. Examples of inorganic absorption pigments are iron oxide pigments and carbon black.

A further pigment for mention is titanium dioxide.

Examples of pigments are listed in WO 97/08255, p. 8, I. 11 to p. 11, I. 16, which is hereby part of the disclosure content of this specification.

The constitution of the coating compositions of the invention is typically as follows:
(A) from 0.1 to 20%, preferably from 1% to 10% by weight,
(B) from 20% to 50%, preferably from 30% to 40% by weight,
(C) from 20% to 50%, preferably from 30% to 40% by weight,
(D) from 0% to 5%, preferably from 0.1% to 5% by weight,
(E) from 0% to 60%, preferably from 0.1% to 40% by weight,
with the proviso that the sum always adds up to 100% by weight.

The molar ratio of nonblocked or blocked isocyanate groups in (B) to isocyanate-reactive groups in (A) and (C) in total amounts in general to 8:1 to 1:8, preferably 5:1 to 1:5, more preferably 2:1 to 1:2, and very preferably 1.5:1 to 1:1.5.

The fraction of hydroxyl groups in the compound (A) as a proportion of the sum of the hydroxyl groups in the compounds (A) and (C) is generally up to 20 mol %, preferably up to 15 mol %, and more preferably up to 10 mol %.

The coating compositions of the invention, comprising at least components (A), (B), and (C), are prepared by mixing these components with one another. It may also be preferable to incorporate component (A) into component (B), followed by mixing with component (C), or first to mix components (A) and (C) with one another and then to mix that mixture with component (A). It would also be conceivable first to mix (B) and (C) and then to mix in (A).

It is a particular embodiment first to mix component (A) and (B) and cause them to react at least partially at elevated temperature in the presence, optionally, of a catalyst. This is followed by mixing with component (B) and also, optionally, other coatings constituents, and by application of the coating composition to the substrate. In this way a substantially uniform distribution of component (A) in the coating is obtained (see below).

In one preferred embodiment, component (A) is mixed with the other components at a temperature above the ambient temperature, as for example at 30 to 80° C., preferably 40 to 60° C.

With particular preference (A) is mixed in the form of a melt with the other components. It is also conceivable to dissolve component (A) in a solvent and to mix that solution with the other components.

The coating compositions of the invention may be either one-component or two-component. Two-component means here that components (B) and (C), and any other film-forming constituents, are mixed with one another not until a relatively short time prior to application, and then react with one another essentially only after application to the substrate. With two-component coating materials, mixing takes place usually within a period of not more than 12 hours, preferably not more than 10 hours, more preferably not more than 9 hours, very preferably not more than 7 hours, in particular not more than 5 hours, and especially not more than 3 hours prior to application to the substrate.

In contrast to these, one-component (1K) coating compositions can be mixed with one another a relatively long time prior to application.

The coatings obtained with the coating compositions of the invention have a glass transition temperature, $T_g$, of generally above −30° C., preferably above −10° C. The upper limit is situated generally at glass transition temperatures $T_g$ of not more than 120° C., preferably not more than 100° C. (by the DSC (differential scanning calorimetry) method in accordance with ASTM 3418/82).

In one preferred embodiment, component (A) forms crystalline phases in the coating, having a diameter of up to 1000 nm, preferably up to 800 nm, more preferably up to 600 nm, very preferably up to 400 nm, and more particularly up to 250 nm. The phases generally have a diameter (measured at the broadest point) of at least 20 nm, preferably at least 50 nm, and very preferably at least 100 nm.

The crystalline phases may be substantially uniformly distributed in the coating; they may essentially form a layer on the surface of the coating; or they may have a higher concentration at the surface than in the interior of the coating. Determination of the diameter of the crystalline phases and definition of the concentration profile take place here as described in EP 1204701 B1.

The arrangement of the crystalline phases in the coating is heavily dependent on the properties of components (A), (B), and (C).

As a rule of thumb, hydrophobic, i.e., long-chain fatty acids (A1) generally produce a uniform distribution of component (A) in the coating, whereas hydrophilic, i.e., short-chain fatty acids (A1) have the effect of an increase in concentration of component (A) toward the surface.

If, however, a particularly hydrophilic polyhydroxy compound (C) is used, then this increase in concentration toward the surface can at least partly be compensated. For the repair (self-healing) of the cured coatings of the invention the coatings are heated for a time of at least 10 minutes, preferably at least 15 minutes, more preferably at least 20 minutes, very preferably at least 30 minutes, with very particular preference at least 45 minutes, and in particular at least 60 minutes to a temperature which is at least 25° C., preferably at least 30° C., and more preferably at least 35° C. above their glass transition temperature.

Such heating can take place by treatment at a corresponding temperature (in a belt oven or other oven, for example) or may also take place, additionally or exclusively, by heating with NIR radiation, NIR radiation here being electromagnetic radiation in the wavelength range from 760 nm to 2.5 μm, preferably from 900 to 1500 nm.

The coating materials of the invention can be employed in particular as primers, surfacers, pigmented topcoat materials, and clearcoat materials in the segments of industrial coating, especially aircraft coating or large-vehicle coating, wood coating, automotive finishing, especially OEM finishing or refinishing, or decorative coating.

The compounds (A) in the coating compositions of the invention, as a result of the meltability they possess, lead to a self-healing effect in the coatings.

The present invention additionally provides for the use of compounds (A) as reactants with di- and polyisocyanates, and the reaction products obtained therewith. The advantage of such reaction products is that in two-component polyurethane coating materials they result in self-healing of the coatings.

ppm and percentage figures used in this specification are by weight unless otherwise indicated.

The examples below are intended to illustrate the invention but not to limit it to these examples.

EXAMPLES

Fatty Acid (A1)

Refined, very hard montan wax (fossil plant wax) composed of long-chain fatty acids ($C_{16}$-$C_{36}$), with an acid number of 125 and a molecular weight of 600 g/mol (Waradur® LS from Völpker Spezialprodukte GmbH).

Polyol (A2)

Hexafunctional polypropylene oxide prepared starting from sorbitol with potassium hydroxide catalysis, having an OH number of 490 (to DIN 53240) and a molecular weight of 570 g/mol.

Polyisocyanate (B1)

HDI isocyanurate having an NCO content of 22.2% and a viscosity of 2800 mPa·s at 23° C. (Basonat® HI 100 from BASF SE).

Polyisocyanate (B2)

IPDI isocyanurate, in 70% strength solution in butyl acetate, having an NCO content of 12.1% and a viscosity of 600 mPa·s at 23° C. (Vestanat® T1890 B from Evonik).

Polyacrylate-ol (C)

Macrynal® SM 636/70 BAC, having an OH number of 135 mg KOH/g, from Cytec.

Wax Ester Preparation (A)

8.0 g of polyol A2 were mixed with 15.0 g of fatty acid A1 at 130° C. and 50 mg of dibutyltin dilaurate were added. Reaction took place under an argon atmosphere at 170° C. for 6 hours. Water and/or alcohol formed was removed from the reaction mixture under reduced pressure (500 mbar). The product was then precipitated from methanol and dried under vacuum.

The polyol-modified crystalline wax A (examples 1 and 2) or the wax (A2—comparative 2) was dissolved in the coating formulation at 60° C., and the films obtained were applied to a glass substrate as follows:

The polyurethane coatings were applied to glass plates (100 mm×150 mm) using a film applicator with a slot width of 200 μm. This produced homogeneous coating films containing different amounts of polyol-modified crystalline waxes.

The coatings were cured at 130° C. for 30 minutes.

| Formulation | Comparative 1 | Comparative 2 | Example 1 | Example 2 |
|---|---|---|---|---|
| A |  | 5 | 2 | 5 |
| B1 | 22.7 | 22.7 | 22.7 | 22.7 |
| B2 | 8.2 | 8.2 | 8.2 | 8.2 |
| C | 102.2 | 102.2 | 102.2 | 102.2 |
| Appearance | clear | hazy | clear | clear |

The coating was subjected to a scratch test. This was done by fitting a ScotchBrite® 7448 type S ultrafine nonwoven pad to a hammer (500 g) and performing a defined number of double rubs (back-and-forth strokes). The gloss was determined with a gloss meter (Erichsen Picogloss 503) (60° measurement geometry) and the samples thereafter were heated at 130° C. for 30 minutes. The gloss was then measured again in the manner described, and the cycle was repeated a number of times.

| Double rubs | Comparative 1 Gloss [%] | Example 1 Gloss [%] | Example 2 Gloss [%] |
|---|---|---|---|
| 0 | 100 | 100 | 100 |
| 50 | 35 | 36 | 56 |
| T = 130° C. | 67 | 81 | 95 |
| 100 | 19 | 33 | 68 |
| T = 130° C. | 33 | 70 | 90 |
| 150 | 15 | 39 | 44 |

-continued

| Double rubs | Comparative 1 Gloss [%] | Example 1 Gloss [%] | Example 2 Gloss [%] |
|---|---|---|---|
| T = 130° C. | 13 | 65 | 54 |
| 200 | 10 | 28 | 44 |
| T = 130° C. | 10 | 48 | 64 |

The invention claimed is:

1. A method of self-healing cured coatings, which comprises heating a coating of a cured coating composition for a period of at least 10 minutes to a temperature which lies at least 25° C. above the glass transition temperature of the coating
wherein said coating composition comprises as constituent components
(A) at least one ester which has at least two hydroxyl groups, formally constructed of
(A1) at least one alkanecarboxylic acid which contains at least 12 carbon atoms and
(A2) at least one polyol having at least three hydroxyl groups,
(B) at least one nonblocked or blocked di- or polyisocyanate, and
(C) at least one polyhydroxy compound selected from the group consisting of polyacrylate polyols, polyester polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft copolymers from the stated groups of compounds and mixtures of the stated binders.

2. The method of self-healing cured coatings according to claim 1, wherein said compound (A1) is selected from the group consisting of lauric acid, myristic acid, pentadecanoic acid, palmitic acid, margaric acid, stearic acid, nonadecanoic acid, arachidic acid, behenic acid, lignoceric acid, hexacosanoic acid, octacosanoic acid, triacontanoic acid, dotricosanoic acid, tritricosanoic acid, tetratricosanoic acid and pentatricosanoic acid.

3. The method of self-healing cured coatings according to claim 1, wherein compound (A2) contains three to six hydroxyl groups.

4. The method of self-healing cured coatings according to claim 1, wherein said compound (A2) is at least one compound selected from the group consisting of trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, and isomalt.

5. The method of self-healing cured coatings according to claim 1, wherein said compound (A2) is singly to triply alkoxylated per hydroxyl group.

6. The method of self-healing cured coatings according to claim 1, wherein said compound (A2) is singly to triply ethoxylated per hydroxyl group.

7. The method of self-healing cured coatings according to claim 1, wherein the melting point of the compound (A) is at least 45° C.

8. The method of self-healing cured coatings according to claim 1, wherein compound (B) is at least one compound selected from the group consisting of urethanes, biurets, and isocyanurates of 1,6-hexamethylene diisocyanate (HDI) or 1-isocyanato-3-isocyanatomethyl-3,5,5-trimethylcyclohexane.

9. The method of self-healing cured coatings according to claim 1, wherein compound (C) has a hydroxyl number of 16.5 to 264 mg KOH/g resin solids.

10. The method of self-healing cured coatings according to claim 1, wherein said coating composition comprises:
(A) from 0.1% to 20% by weight,
(B) from 20% to 50% by weight,
(C) from 20% to 50% by weight,
typical coatings additives (D) from 0% to 5% by weight,
pigments and/or fillers (E) from 0% to 60% by weight,
with the proviso that the sum is always 100% by weight.

11. The method of self-healing cured coatings according to claim 1, wherein compounds (A) has on average 2 to 20 hydroxyl groups.

12. The method of self-healing cured coatings according to claim 1, wherein compounds (A) has on average 2 to 3 hydroxyl groups.

13. The method of self-healing cured coatings according to claim 1, wherein hydroxyl groups are present in compounds (A) in amounts of up to 5 mol/kg.

14. The method of self-healing cured coatings according to claim 1, wherein hydroxyl groups are present in compounds (A) in amounts of 1 to 3 mol/kg.

15. The method of self-healing cured coatings according to claim 1, wherein said alkanecarboxylic acid contains up to 100 carbon atoms.

16. The method of self-healing cured coatings according to claim 1, wherein said alkanecarboxylic acid contains up to 60 carbon atoms.

17. The method of self-healing cured coatings according to claim 1 wherein said compound (B) has a NCO functionality of at least 1.8.

18. The method of self-healing cured coatings according to claim 1, wherein said compound (B) has a NCO functionality of 1.8 to 5.

* * * * *